(12) United States Patent
Gichuhi et al.

(10) Patent No.: US 7,306,663 B2
(45) Date of Patent: Dec. 11, 2007

(54) CORROSION INHIBITOR

(75) Inventors: Tony Gichuhi, Hobart, IN (US); Wendy Novelli, Schererville, IN (US)

(73) Assignee: Halox, division of Hammond Group, Inc., Hammond, IN (US)

( * ) Notice: Subject to any disclaimer, the term of this patent is extended or adjusted under 35 U.S.C. 154(b) by 165 days.

(21) Appl. No.: 10/634,389

(22) Filed: Aug. 5, 2003

(65) Prior Publication Data

US 2005/0032664 A1 Feb. 10, 2005

(51) Int. Cl.
*C04B 103/61* (2006.01)

(52) U.S. Cl. .............................. 106/14.14; 106/14.13; 106/14.15; 106/14.16; 106/14.17; 106/14.18; 510/402; 510/499

(58) Field of Classification Search ...................... None
See application file for complete search history.

(56) References Cited

U.S. PATENT DOCUMENTS

| | | | |
|---|---|---|---|
| 4,051,066 A | 9/1977 | Miksic et al. | |
| 4,124,549 A | 11/1978 | Hashiudo et al. | |
| 4,131,583 A | 12/1978 | Boerwinkle | |
| 4,219,433 A | 8/1980 | Manabe et al. | |
| 4,243,317 A | 1/1981 | Garbe et al. | |
| 4,379,072 A | 4/1983 | Yarham et al. | |
| 4,812,503 A * | 3/1989 | Baseman .................... | 524/226 |
| 4,885,324 A | 12/1989 | Hegedus et al. | |
| 5,043,373 A | 8/1991 | Hegedus et al. | |
| 5,100,942 A | 3/1992 | Hegedus et al. | |
| 5,236,983 A | 8/1993 | Hegedus et al. | |
| 5,466,389 A * | 11/1995 | Ilardi et al. .................. | 510/175 |
| 5,519,074 A * | 5/1996 | Kramer et al. ................ | 524/99 |
| 5,989,353 A * | 11/1999 | Skee et al. ...................... | 134/2 |
| 6,127,467 A * | 10/2000 | Gaglani ...................... | 524/178 |
| 6,492,308 B1 * | 12/2002 | Naghshineh et al. ......... | 510/175 |
| 2002/0077259 A1 * | 6/2002 | Skee ........................... | 510/175 |
| 2002/0181342 A1 * | 12/2002 | Clark ....................... | 369/44.23 |

FOREIGN PATENT DOCUMENTS

| | | |
|---|---|---|
| DE | 867 192 | 2/1953 |
| DE | 39 23 283 A1 | 1/1991 |
| EP | 0 020 042 A2 | 12/1980 |
| WO | WO 84/02146 A1 | 6/1984 |

OTHER PUBLICATIONS

European Patent Office Examination Report issued in EP application No. 04077156.0-1215, dated Jul. 31, 2006.
European Patent Office Search Report issued in EP application No. 04077156.0-1215, dated Nov. 5, 2004.

* cited by examiner

*Primary Examiner*—Gregory R. Del Cotto
(74) *Attorney, Agent, or Firm*—Patula & Associates, P.C.

(57) ABSTRACT

A liquid corrosion inhibitor comprising a primary, secondary, tertiary or mixed amine complexing agent and a carboxylic acid complexing agent, and may further contain a pH adjusting agent and an antifreeze agent, which is capable of providing both short-term and long-term corrosion protection on ferrous and non-ferrous metal substrates and protection from flash rusting commonly associated with ferrous metal substrates, without adversely affecting high gloss in coatings.

26 Claims, No Drawings

CORROSION INHIBITOR

The present invention relates generally to corrosion inhibitors, and in particular to an improved corrosion inhibitor which may be used alone, or incorporated into or post added to a paint coating for inhibiting corrosion of ferrous and non-ferrous metal substrates, including long term corrosion and flash rusting commonly associated with ferrous metal substrates. More specifically, the present invention is a liquid corrosion inhibitor comprising a water-based amine complex salt of carboxylic acid resulting in improved inhibiting of long-term corrosion and early flash rusting, without decreasing high gloss resins.

BACKGROUND OF THE INVENTION

Coatings for metal substrates have a variety of applications. Traditionally, coatings have required a multi-coat system, i.e., a primer and topcoat system to combat corrosion. Less costly and faster alternatives are available in the form of Direct to Metal (DTM) coatings, which are self-priming, i.e., act as both a primer and a topcoat. DTM coatings are generally available in semi-gloss, high-gloss, flat or dull matte finishes. High-gloss is understood in the industry as having greater than or equal to 85 gloss units at a 60-degree viewing angle.

A common problem however with high-gloss DTM coating applications is that they do not provide adequate, long-term corrosion protection because they lack corrosion inhibitive pigments. Inhibitive pigments which provide long-term corrosion protection have been unsuitable for incorporation into high gloss DTM coatings, even at low loading levels, because their high oil absorption considerably decreases the gloss or shine of the finish. In high gloss resin coatings, conventional long-term corrosion inhibitive pigments produce an undesirable semi-gloss or flat finish.

Conventional high gloss DTM coatings, such as thin film acrylic and modified acrylic coatings, rely upon their barrier and good adhesion properties and low levels of flash rust inhibitors such as sodium nitrite and ammonium benzoate to provide short-term corrosion protection. Flash rusting causes the appearance of rust spots on a metal substrate shortly after a water-based coating is applied under humid conditions. However, flash rust inhibitors are not sufficiently effective to provide long-term corrosion protection due to their high solubility.

Commercially available petroleum-based corrosion inhibitors with low water solubility, such as metallic sulfonates in non-hazardous air polluting (HAP) solvents in liquid form, pigment compositions containing heavy metal salts (e.g., zinc) of carboxylic acids, and flash rust inhibitors formed with nitrites and nitrates have limited use as long-term corrosion inhibitors in direct to metal applications. However, the high costs and toxicity of these corrosion inhibitors make them cost-prohibitive and impractical for commercial use. Although effective flash rust inhibitors, nitrites and nitrates mixed with amines react to form N-nitrosamines, which are known potent carcinogens. Solvents can evaporate to become hazardous air pollutants (HAPS) and contribute to volatile organic compounds (VOCs). Solvents such as butyl cellusolve (ethylene glycol mono butyl ether) are toxic to humans.

Consequently, a need exists for a corrosion inhibitor that is cost effective, heavy metal free, nitrite free, solvent free, non-toxic, environmentally friendly, does not absorb oil, may be added directly to metal paint coatings, provides long-term corrosion protection, early flash rusting protection, does not adversely affect high gloss resins and may be used solely without other coating components.

In addition to the need for long-term corrosion protection in primer/topcoat and direct to metal applications that would be compatible with high gloss resins, it is also desirable to provide such corrosion resistance in thin films, decreasing the need for multiple applications and the time for film curing.

U.S. Pat. No. 5,043,373 to Hegedus et al. discloses high gloss corrosion resistant coatings that may be applied directly to metal in a single topcoat. The coatings comprise a polyurethane binder and pigment inhibiting system consisting essentially of zinc phosphate, zinc salt of benzoic acids and zinc molybdate. The '373 patent does not disclose or suggest the use of a water-based amine complex salt of a carboxylic acid as a corrosion inhibitor. Further, unlike the present invention, the '373 patent requires the use of heavy metal ions. A drawback to heavy metals is that their high cost and toxicity considerably limits their suitability for commercial use. The present invention, which is in liquid form, is free of heavy metals and does not require synergistic inhibitive pigments such as molybdates and phosphates.

U.S. Pat. No. 5,236,983 to Hegedus et al. discloses polyurethane self-priming topcoats that comprise a polyurethane binder and a combination of inhibitive pigments consisting essentially of an alkaline earth metal phosphosilicate, zinc salts of benzoic acids, an alkaline earth metal phosphate, titanium dioxide, a surface active agent and at least one organic solvent. The surface-active agent of the '983 patent may also be oil soluble. Unlike, the '983 patent, the present invention does not require heavy metal ions. Furthermore, the present invention is not oil soluble, and therefore does not detrimentally affect high gloss resins.

U.S. Pat. No. 4,885,324 by Hegedus et al. discloses a combination primer and topcoat coating for metallic or polymeric composite surfaces comprising a two component aliphatic polyurethane binder and inhibitive pigments consisting essentially of titanium dioxide, zinc molybdate, zinc phosphate and zinc salt of a substituted benzoic acid. Unlike the present invention, the '324 patent relies on heavy metal ions and requires inhibitive pigments such as molybdates and phosphates.

U.S. Pat. No. 5,100,942 to Hegedus et al. discloses high gloss corrosion resistant acrylic coatings comprising an acrylic resin, titanium dioxide, an organic solvent and a combination of corrosion inhibiting pigments consisting essentially of zinc phosphate, zinc molybdate and zinc salt of a benzoic acid. Unlike the '942 patent, the present invention does not require heavy metals or inhibitive pigments. Also unlike the '942 patent, the present invention is a water-based corrosion inhibitor which does not require the addition of any solvents, and may be used alone or combined with conventional paint coating applications.

U.S. Pat. No. 4,243,317 to Grouke et al. discloses corrosion inhibiting aqueous latex paints containing dispersed water soluble complexes of a polyvalent metallic ion, a volatile complexing agent and a corrosion inhibiting anion. Unlike the present invention, the '317 patent utilizes metal ions, which are disadvantageous and undesirable.

U.S. Pat. No. 6,127,467 to Gaglani discloses compositions for inhibiting corrosion in coating applications for metal substrates comprising at least one aminocarboxylate salt containing a metal ion, a pigment, a binder and a solvent. However, the '467 patent does not disclose, teach or suggest the use of a water-based amine complex salt of a carboxylic acid without heavy metal ions, inhibitive pigments or hazardous solvents.

U.S. Pat. No. 4,219,433 to Manabe et al. discloses a metal corrosion inhibitor comprising benzoic acid and/or benzoate, a trialkanolamine, phosphoric acid and/or phosphate and at least one member selected from mercaptobenzothiazole, benzotriazole and tolyltriazole. Unlike the '433 patent, the present invention does not require azoles, which are toxic and therefore hazardous and not environmentally-friendly. The '433 patent teaches a corrosion inhibitor particularly suited for cooling systems and internal combustion engines, and does not disclose an inhibitor suitable for high gloss resins nor multiple applications for metal substrates, unlike the thin film water-based coatings of the present invention.

U.S. Pat. No. 4,051,066 to Miksic et al. discloses solid corrosion inhibiting elastomers containing an elastomeric matrix containing a corrosion inhibiting amount of cyclohexamethyleneimine dinitrobenzoate. The '066 patent teaches that corrosion inhibitors must be milled, entrapped or uniformly dispersed into rubber-like polymers or elastomers as volatile corrosion inhibitors that must have sufficient vapor pressure. Unlike the '066 patent, the present invention does not require that it be milled. The '066 patent disclosure does not teach or suggest a stable liquid form corrosion inhibitor as in the present invention, which is not volatile and may be applied alone or easily added to conventional paint coating formulas.

U.S. Pat. No. 5,519,074 to Kramer et al. discloses crystalline complexes of morpholine derivatives with keto-acids as corrosion inhibitors. Unlike the present invention, the '074 patent requires the use of keto-acids and a reaction calling for two parts keto-acid to one part base, unlike present invention. Further, the present invention may be applied to a metal substrate without the addition of a coating composition, unlike the '074 patent. The present invention also forms a liquid product, whereas the '074 patent produces a crystalline solid product. The solid compound corrosion inhibitor of the '074 patent must be diluted in water and grinded into a paint coating, unlike the present invention. In addition, unlike the present invention, the '074 patent teaches that washing, filtration, drying and the use of environmentally unfriendly protic or aprotic solvents, resulting in volatile organic compounds (VOCs), are required to isolate the '074 invention. The present invention does not require washing, drying, filtration or the use of solvents. In addition, the present invention, demonstrates significantly enhanced barrier properties when compared to the commercial embodiment of the '074 invention, namely Irgacor® 1405.

The present invention overcomes the disadvantages and/or shortcomings of known prior art metal substrate corrosion inhibitors and provides a significant improvement thereover.

SUMMARY OF THE INVENTION

A corrosion inhibitor and method of preventing long-term corrosion and early flash rusting on metal substrates using an amine complex salt of carboxylic acid is disclosed herein. The water-based amine complex salt of carboxylic acid chemical composition may be incorporated into a conventional primer/topcoat or direct to metal paint coating product, which may also contain high gloss resins, which when applied to a metal substrate, exhibits improved corrosion and flash rusting inhibiting properties without decreasing the high gloss of the finish. Alternatively, the water-based amine complex salt of carboxylic acid composition may be applied to metal substrates directly to provide a corrosion-inhibitive film which blocks corrosive ions.

Accordingly, an object of the invention is to provide an effective and stable corrosion inhibitor comprising a water-soluble amine complex salt of carboxylic acid.

Another object of the invention is to provide a corrosion inhibitor that will provide long-term corrosion protection.

Yet another object of the invention is to provide a corrosion inhibitor that will provide early flash rust protection without diminishing long-term corrosion protection.

Yet another object of the invention is to provide a water-soluble corrosion inhibitor comprising an amine complex salt of benzoic acid that can be post-added into conventional primer/topcoat and direct to metal paint coating systems or added under agitation during the letdown phase.

Yet another object of the invention is to provide a corrosion and flash rust inhibitor that may be applied directly to a metal substrate to provide a protective film.

Yet another object of the invention is to provide a corrosion inhibitor that has no oil absorption and therefore does not adversely affect high gloss resins in conventional primer/topcoat and direct to metal substrate paint coating systems.

Yet another object of the invention is to provide a corrosion inhibitor that does not contain nitrites, heavy metals or toxic elements.

Yet another object of the invention is to provide a corrosion inhibitor that inhibits long-term corrosion by strongly adhering to the metal substrate by chemisorption, resulting in improved barrier properties improving the resistance to moisture, reducing osmotic blistering and maintaining an alkaline pH at the coating-substrate interface.

Yet another object of the invention is to provide a long-term corrosion inhibitor that may be incorporated into paint coatings, without the need of inhibitive pigments, coalescent solvents or lubricants, and that will not detrimentally affect the gloss of the coating on a metal substrate.

Yet another object of the invention is to provide a water-based corrosion inhibitor which when applied directly or after incorporation into a paint coating results in a thin protective film.

Yet another object of the invention is to provide short-term early flash rust protection and long-term corrosion protection at the same loading level.

Numerous other objects, features and advantages of the present invention will become readily apparent from the detailed description of the embodiments and from the claims.

DETAILED DESCRIPTION OF THE PREFERRED EMBODIMENT

While the invention is susceptible of embodiment in many different forms, there will be described herein in detail, preferred and alternate embodiments of the present invention. It should be understood, however, that the present disclosure is to be considered an exemplification of the principles of the invention and is not intended to limit the spirit and scope of the invention and/or claims of the embodiments illustrated.

The present invention is a flash rust and corrosion inhibitor comprising an amine complex salt of carboxylic acid chemical composition. The resulting aminocarboxylate salt provides an effective and stable water-based corrosion, inhibitor.

The present invention uses a mixture of a first complexing agent, a second complexing agent, water, and a pH adjusting agent to form the flash rust and corrosion inhibitor. More specifically, the present invention uses a mixture of water, an amine as the first complexing agent, an aromatic or non-aromatic carboxylic acid as the second complexing agent and an ammonium hydroxide solution as the pH adjusting agent. The pH adjusting agent is added to raise the pH to a basic level which is compatible with conventional paints, such as acrylic latex paints.

In an alternate embodiment of the invention, a pH adjusting agent is not required for compatibility with conventional water-based paints by adding an excess of amine base relative to the carboxylic acid.

In general, the present invention uses a mixture of approximately 50-80% (preferably 50-70%) by total formula weight hot water (preferably at a temperature between approximately 50-100° C.), approximately 2-20% (preferably 5-15%) by total formula weight of an amine complexing agent, and approximately 5-20% (preferably 10-17.5%) by total formula weight of a carboxylic acid complexing agent. Further, the present invention preferably includes approximately 5-7% by total formula weight of a pH adjusting agent. The mixture may also contain approximately 5-7% of an antifreeze agent.

In a preferred example, the present invention uses a mixture of hot water at 67.1% by total formula weight at a temperature between approximately 65-85° C., dimethylaminopropylamine at 8.7% by total formula weight, benzoic acid at 17.5% by total formula weight, and a 28-30% aqueous solution of ammonium hydroxide at 6.7% by total formula weight. Alternatively, the present invention uses a mixture of hot water at 62.9% by total formula weight, 4-ethylmorpholine at 11.8% by total formula weight, benzoic acid at 12.7% by total formula weight, ammonium hydroxide at 6.3% by total formula weight and propylene glycol at 6.3% by total formula weight. It is to be understood, of course, that alternate embodiments can modify or change the concentrations, by total formula weight contributions or species from the general chemical group genre of the foregoing without changing the true scope and spirit of the present invention.

For example, a complexing agent selected from the groups consisting essentially of primary, secondary, tertiary or mixed amines can be used. More specifically, an amine selected from the groups consisting essentially of 3-methoxypropylamine, morpholine, 4-ethylmorpholine, triethalanolamine, dimethylaminopropylamine and aminopropylmorpholine can be used as an amine complexing agent. A second complexing agent selected from the group consisting essentially of aromatic or non-aromatic carboxylic acids can be used. More specifically, benzoic acid may be used as a carboxylic acid complexing agent. It is foreseen that other carboxylic acids will also be suitable for use in the present invention, including but not limited to, low melting point or low molecular weight carboxylic acids such as benzoic acid derivatives (such as nitrobenzoic acid, methoxybenzoic acid and ethoxybenzoic acid), alkyl substituted benzoic acids (such as methyl, ethyl or propyl benzoic acid), straight chain carboxylic acids (such as two- to ten-carbon acids including ethanoic acid, propanoic acid, pentanoic acid, hexanoic acid, heptanoic acid, octanoic acid, nonanoic acid and decanoic acid) and di- and tricarboxylic acids (such as terephthalic acid, isophthalic acid and benzene-1,3,5-tricarboxylic acid. An ammonium hydroxide solution may be used as the pH adjusting agent. An antifreeze agent selected essentially from the groups consisting essentially of propylene or ethylene series glycols can be used. More specifically, an ethylene or propylene series glycol selected from the groups consisting essentially of propylene glycol, polypropylene glycol, polyethylene glycol, ethylene glycol, tri-propylene glycol, di-propylene glycol, tri-ethylene glycol and di-ethylene glycol can be used.

The resultant aminocarboxylate complex salt is water-soluble. The aminocarboxylate complex forms a stable solution in water. In the preferred embodiment, the water-soluble, volatile amine is dissolved into a slightly water-soluble carboxylic acid, such as benzoic acid, by a liquid acid-base reaction. The reaction of the amine and carboxylic acid forms a water-soluble complex salt. The preferred embodiment of the present invention uses the following reaction:

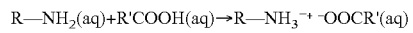

$$R\text{—}NH_2(aq) + R'COOH(aq) \rightarrow R\text{—}NH_3^{-+}\ ^-OOCR'(aq)$$

The resultant complex salt solution inhibitor is completely miscible with water and may be used alone as a water solution. The solution may be added to a water-based paint either during the manufacturing process or after production of the paint. When incorporated into the paint during the manufacturing process, the inhibitor solution is preferably incorporated by blending with agitation during the letdown phase. When post-added, it is preferable to add the inhibitor solution under agitation.

The corrosion inhibitor is preferably used in direct to metal thin film coating applications, preferably less than 5 mils (125 microns) thickness. However, the inhibitor solution may also be used with conventional primer/topcoat metal coating systems or alone without a coating. The resulting complex ion water solution has a boiling point above approximately 200° F. and is therefore non-flammable due to the high water content. The complex ion solubility in water provides early flash rust resistance on ferrous metal substrates. The inhibitor also becomes less soluble over time as water and volatile components evaporate from the film during the curing process, providing long-term corrosion protection. Long-term corrosion protection is also provided by enhanced adhesion and barrier properties. The corrosion inhibitor may be used at loading levels between approximately 1 to 10% (preferably between 1-3%) by total formula weight of the paint.

The present invention is used in metal substrate coatings, but preferably is used in a direct to metal water-based paint coating application with high gloss resins. The present invention may also be used in metal substrate coatings with or without high gloss or semi gloss resins. With the incorporation of the corrosion inhibitor into the paint coat application, long-term corrosion and short-term flash-rust protection is provided without adversely affecting the high gloss resins.

In addition to applications in metal substrate coatings, the corrosion inhibitor of the present invention may also be used in metalworking or cutting fluids to provide corrosion resistance to freshly exposed metal and as a surface treatment for pigments in order to improve their dispersibility in paint and enhance the adhesion of the coating to a substrate.

The present invention can be better illustrated with the following examples, which are intended to further explain, and not to limit, the invention. The following examples illustrate examples of mixtures for forming the water-based corrosion inhibitor:

EXAMPLE 1

An aqueous corrosion inhibitor is created by filling a mixer with approximately 50-70% by total formula weight of hot water at a temperature of between approximately 65-85° C., adding approximately 8-15% by total formula weight of 3-methoxypropylamine, and then adding approximately 10-15% by total formula weight of benzoic acid, which is dissolved in the mixture and reacts with the amine to form a stable soluble complex. Approximately 5-7% by total formula weight of ammonium hydroxide is then added, allowing the product to form a clear colorless mixture. The product is then immediately transferred to a holding tank where the mixture is allowed to cool to room temperature. The physical properties, such as pH, specific gravity, appearance and color of the resulting product may then be analyzed.

EXAMPLE 2

The same procedure as described in Example 1 is performed, but with the substitution of approximately 8-15% by total formula weight of 4-ethylmorpholine instead of 3-methoxypropylamine. The product forms a pale yellow mixture.

EXAMPLE 3

The same procedure as described in Example 2 is performed, but with the substitution of triethanolamine instead of 4-ethylmorpholine. The product forms a clear colorless mixture.

EXAMPLE 4

The same procedure as described in Example 2 is performed with the substitution of morpholine instead of 4-ethylmorpholine. The product forms a light yellow mixture.

EXAMPLE 5

The same procedure as described in Example 2 is performed, but with the substitution of aminopropylmorpholine for 4-ethylmorpholine. The product forms a yellow mixture.

EXAMPLE 6

The same procedure as described in Example 2 is performed, but with the substitution of dimethylaminopropylamine for 4-ethylmorpholine. The product forms a slightly turbid colorless mixture.

EXAMPLE 7

The same procedure as described in Example 2 is performed. Following the addition of ammonium hydroxide, 5-7% by total formula weight propylene glycol is added to improve the freeze-thaw stability of the liquid inhibitor. The product forms an amber-colored mixture. The resulting product is then transferred to holding tank to cool to room temperature and is analyzed for its physical properties.

EXAMPLE 8

An aqueous corrosion inhibitor, with an excess of amine, is created by charging a mixer with approximately 50-80% by total formula weight of hot water at a temperature of between approximately 50-100° C., adding approximately 5-20% by total formula weight of 3-methoxypropylamine, and then adding approximately 5-15% by total formula weight of benzoic acid, which dissolves in the mixture and reacts with the amine allowing the product to form a clear, colorless, stable soluble complex. The product is then immediately transferred to a holding tank where the mixture is allowed to cool to room temperature before being analyzed for its physical properties.

The inhibitor mixtures described in Examples 1-8 were added to individual paints using a high gloss white water based acrylic emulsion starting point formula from Neoresins® (No. WB-2049). The liquid corrosion inhibitors were post-added or blended (between 1.0-2.0% by total formula weight) in the letdown phase in place of a flash rust inhibitor. The high gloss resin is characterized as a general industrial topcoat with very high gloss, good adhesion, UV resistance, humidity resistance, corrosion resistance and excellent surface hardness. The high gloss white water based acrylic emulsion formula is listed in Table 1 and was used for all tests described herein. The high gloss water based acrylic emulsion is representative of a DTM coating formula used in industrial maintenance applications.

The mixture created according to Example 2 was incorporated into a conventional water-based acrylic latex paint according to Table 1 and tested, the results of which are shown in Tables 2-8. The resultant corrosion inhibiting coating demonstrated enhanced barrier properties and was determined to be highly resistant and inhibitive to corrosion and flash-rusting without affecting specular gloss. The resultant corrosion inhibiting coating was then analyzed for dry film thickness, long-term salt spray corrosion, scribe and field (panel) blistering, degree of flash rusting, specular gloss, humidity resistance, in-can stability and electrochemical impedance.

TABLE 1

High Gloss White Acrylic Emulsion

| MATERIALS | POUNDS | % WEIGHT |
|---|---|---|
| Water | 63.7 | 6.27 |
| DPnB | 31.8 | 6.27 |
| Petrolite ® D-1038 | 21.2 | 2.09 |
| AMP-95 ® | 1.6 | 0.16 |
| Nopco ® NXZ | 1.6 | 0.16 |
| Kronos ® 2310 | 190.7 | 18.78 |
| Rheolate ® 300 | 3.17 | 0.31 |
| NeoCryl ® A-6099 | 523.3 | 51.51 |
| Ammonia (28%) | 5.23 | 0.51 |
| Water | 92.23 | 9.08 |
| Inhibitor of Example 2 | 20.01 | 2.00 |
| Dehydran ® 1293 | 2.11 | 0.21 |
| Byk ® 301 | 2.11 | 0.21 |
| PnB | 31.49 | 3.1 |
| Benzoflex ® 9-88 | 5.29 | 0.52 |
| Texanol ® | 9.9 | 0.97 |
| Totals | 1005 | 100.00 |

% PVC 19.7;
pH 8.5–9.5;
KU viscosity 55–60;
ICI poise 0.30–0.50

Test samples were created using the mixture described above in Table 1. Test panels were created for comparing the present invention liquid corrosion inhibitors against a blank panel containing no corrosion inhibitor and against panels containing either commercially available liquid corrosion inhibitors or flash rust inhibitors namely ammonium benzoate (10% solution), sodium nitrite (15% solution) and Irgacore® 1405 (30% solution) at the equal loading levels, i.e., approximately 1.0-2.0% based on the total weight of paint in the formula described above. The test panels were evaluated for flash rust protection, salt spray, humidity resistance, specular gloss, stability or viscosity changes, Prohesion/QUV® cycling, and electrochemical impedance. The methods employed for rating the degree of corrosion on the panels were panel corrosion D 610-85, scribe corrosion D 1654-79A and panel/scribe degree of blistering D 714-87. For long-term corrosion testing, the mixtures were applied to several substrates and allowed to completely cure for seven days. The dry film thickness measured generally between 1-2 mils (or 25-50 microns). For short-term corrosion protection, the liquid corrosion and flash rust inhibitor of the present invention was applied to a weld on a seam panel, blasted hot rolled steel substrates (BHRS) and cold rolled steel substrates (CRS). The dry film thickness measured approximately 1.5 mils and was then exposed to 95% humidity in a temperature-controlled cabinet.

Table 2 is a tabulation of the degree of flash rusting measurements after the substrates were exposed to 95% relative humidity at 75° F. for two hours and then removed. After testing, the test substrates were rated for flash rust occurrence. Flash rusting occurrence was measured according to a qualitative method rating flash rust occurrence from none, trace, slight, moderate, severe to very severe.

The liquid corrosion inhibitor of Example 2 was tested against a blank control and against three known flash rust and corrosion inhibitors: ammonium benzoate (10% solution), sodium nitrite (15% solution) and Irgacor® 1405 (30% solution).

TABLE 2

Evaluating Degree of Flash Rusting in Humid Environment

| Inhibitor | Weld Seam | BHRS | CRS |
| --- | --- | --- | --- |
| Blank | Very Severe | Very severe | Moderate |
| Ammonium benzoate | Slight | Very severe | Trace |
| Sodium nitrite | None | None | None |
| Irgacor® 1405 | None | None | None |
| Liquid Inhibitor of Example 2 | None | None | None |

Table 3 is a tabulation of the degree of long-term salt spray corrosion measurements on cold rolled steel substrates using salt spray protocol ASTM accelerated test method B-117, for a period of 264 and 504 hours respectively. Table 3 lists measurements for the dry film thickness (DFT), panel blistering, panel corrosion and scribe. Salt spray corrosion was evaluated according to a qualitative measurement system rating corrosion as severe (NR), medium (M), dense (D), few (F), very few (VF) and a number system ranging from 10, best, to 1, worst.

TABLE 3

ASTM B-117 Salt Spray

| | | 264 Hours | | | 504 Hours | |
| --- | --- | --- | --- | --- | --- | --- |
| Inhibitor | DFT (mil) | Panel Blist. | Panel Corr. | Scribe | Panel Blist. | Panel Corr. | Scribe |
| Blank Control | 1.31 | 8M | 8M | 8D | NR | NR | NR |
| Ammonium Benzoate | 1.29 | 8VF | 8VF | 6MD | 6MD | 6MD | 4M |
| Irgacor® 1405 | 1.24 | 6M | 6M | 6F | 4F | 4F | 6F |
| Liquid Inhibitor of Example 2 | 1.24 | 8F | 8F | 8F | 6M | 6M | 6M |

Table 4 is a tabulation of the degree of corrosion based on Prohesion/QUV® cycling measurements on cold rolled steel substrates which were rotated from one week of QUV® exposure (168 hours) to one week of Prohesion (168 hours) testing. The test was run for 3024 hours or nine cycles. One complete cycle equates to 336 hours. The test panels were evaluated for dry film thickness, panel blistering, panel corrosion and undercutting at the scribe according to a qualitative method for measuring corrosion as severe (NR), medium (M), dense (D), few (F), very few (VF) and rating from 1, worst, to 10, best. The Prohesion/QUV® test is a modified salt fog cabinet described in ASTM G-85 (Annex 5). Unlike the static ASTM B-117 salt fog test, the Prohesion/QUV® testing, which incorporates UV/condensation cycles with wet/dry salt-spray cycles, more closely mimics the corrosive environment the coating is subjected to in an industrial setting.

TABLE 4

ASTM G-85 (Annex 5) Prohesion/QUV®

| Inhibitor | DFT (mil) | Panel Blist. | Panel Corr. | Scribe | Comments |
| --- | --- | --- | --- | --- | --- |
| Blank Control | 1.35 | 6M | 6M | 6MD | Discolored due to flash rust |
| Ammonium benzoate | 1.22 | 6MD | 6MD | 6D | Severe coating degradation |
| Irgacor® 1405 | 1.23 | 6F | 6F | 6M | Coating degradation. |
| Liquid Inhibitor of Example 2 | 1.36 | 8M | 8M | 8MD | No adverse effects |

Table 5 is a tabulation of specular gloss measurements on cold rolled steel substrates after the coating had been allowed to cure for one week. Specular glosses were measured at 200 and 60° with respect to the standard angle of the observer. The coating revealed no decrease in gloss as result of adding the inhibitor of the present invention.

TABLE 5

ASTM D-523 Specular Gloss

| | DFT | Gloss | | |
| --- | --- | --- | --- | --- |
| Inhibitor | (mil) | 20° | 60° | Comments |
| Blank Control | 1.31 | 9.0 | 52.1 | Severely compromised by flash rusting |
| Ammonium benzoate | 1.29 | 74.7 | 91.7 | No flash rusting |
| Irgacor® 1405 | 1.24 | 58.7 | 90.4 | No flash rusting |
| Liquid Inhibitor of Example 2 | 1.21 | 77.0 | 91.8 | No flash rusting |

The film hardness of the corrosion inhibitor coatings on cold rolled steel substrates was measured using pencil leads of known hardness according to ASTM method D3363. The testing began with the hardest pencil 9H and continued down the hardness scale until the pencil that would not cut or gouge the film coating. The coating containing the corrosion inhibitor of the present invention demonstrated the same pencil hardness values as the blank control and the coatings containing the known corrosion inhibitors. This indicates that the physical properties of the coating remained unaffected by the inhibitor of the present invention. Some inhibitors are known to change the curing properties of the coating leading to softer or harder coatings.

Table 6 is a tabulation of the humidity resistance on cold rolled steel substrates after one week (168 hours) of curing. The Cleveland Condensing Cabinet described in ASTM D-4585 is used to determine the moisture resistance of a coating exposed to high humidity. The coated side is exposed to water vapor from heated water maintained at 120° F. The non-coated side is exposed to the ambient temperature. This temperature difference forces condensation on the coated side. Poor humidity resistance causes the coating to blister and lose adhesion.

TABLE 6

ASTM D-4585 Cleveland Condensing Humidity Resistance

| Inhibitor | DFT | Panel Blistering | Comments |
|---|---|---|---|
| Blank Control | 1.30 | 8M | Discolored by flash rusting |
| Ammonium benzoate | 1.49 | 8VF | No flash rusting |
| Irgacor ® 1405 | 1.54 | 10 | No flash rusting |
| Liquid Inhibitor of Example 2 | 1.49 | 10 | No flash rusting |

Table 7 is a tabulation of the stability of the liquid corrosion inhibitors, measured after thirty days at room temperature and at 55° C. The viscosity was measured in Kreb units. The liquid inhibitors of the present invention exhibited stability at room temperature and at 55° C.

TABLE 7

In-Can Stability of High Gloss Acrylic Emulsion (Stormer Viscosity/Kreb Units)

| Inhibitor | Initial Visc. | Final Visc. @ 25° C. | Final Visc. @ 55° C. | Change @ 25° C. | Change @ 55° C. |
|---|---|---|---|---|---|
| Blank Control | 59 | 70 | 80 | 11 | 21 |
| Liquid Inhibitor of Example 2 | 59 | 75 | 87 | 16 | 28 |

Table 8 is a tabulation of the electrochemical impedance spectroscopy (EIS) results for coatings with and without the corrosion inhibitors, measured after the thin films were allowed to cure for 168 hours followed by 24 hours of hydration of the coatings in a 5% sodium chloride (NaCl) solution at room temperature. Impedance was measured for a solution-exposed coated cell area of 14.6 cm$^2$+5%. EIS can be used to measure a coatings barrier properties based on the coatings impedance. Impedance is defined as the resistance to the flow of electrical current. The magnitude of the impedance is proportional to the insulating ability of the coating. A large impedance value implies that the coating has good barrier properties. Conversely, a decrease in the impedance over time in a coating signifies a loss in barrier function. The present invention, demonstrates significantly enhanced barrier properties compared to Irgacor® 1405, as described below in Table 8.

TABLE 8

Summary of Electrochemical Impedance

| Inhibitor | DFT (mil) | Impedance @ 0.01 Hz (×10$^6$ Ω · cm$^2$) | Comments |
|---|---|---|---|
| Blank Control | 1.34 | 0.217 | Discolored by flash rusting |
| Irgacor ® 1405 | 1.30 | 0.468 | No flash rusting |
| Liquid Inhibitor of Example 2 | 1.31 | 4.65 | No flash rusting |

In summary, as can be seen from the foregoing flash rust resistance (Table 2), salt fog resistance (Table 3), Prohesion/QUV® cycling corrosion resistance (Table 4), specular gloss (Table 5), humidity resistance (Table 6), stability test results (Table 7) and electrochemical impedance (Table 8), the present invention produces highly favorable results, while at the same time overcoming the disadvantages of known prior art corrosion inhibitors. Such results are an improvement over known prior art corrosion inhibitors.

The foregoing specification describes only the preferred embodiment and alternate embodiments of the invention. Other embodiments besides the above may be articulated as well. The terms and expressions therefore serve only to describe the invention by example only and not to limit the invention. It is expected that others will perceive differences, which while differing from the foregoing, do not depart from the spirit and scope of the invention herein described and claimed.

What is claimed is:

1. A paint mixture containing a chemical composition that inhibits corrosion in metal substrates when applied thereto, said chemical composition comprising:
   a first complexing agent comprising an amine group; and
   a second complexing agent comprising a carboxylic acid;
   wherein the first complexing agent is an alkylamine selected from the group consisting of 3-methoxypropylamine, 4-ethylmorpholine, dimethylaminopropylamine and aminopropylmorpholine.

2. The paint mixture of claim 1, wherein the alkylamine is 3-methoxypropylamine.

3. The paint mixture of claim 1, wherein the alkylamine is 4-ethylmorpholine.

4. The paint mixture of claim 1, wherein the alkylamine is dimethylaminopropylamine.

5. The paint mixture of claim 1, wherein said second complexing agent is benzoic acid.

6. The paint mixture of claim 1, further comprising a pH adjusting agent.

7. The paint mixture of claim 6, wherein said pH adjusting agent is ammonium hydroxide.

8. The paint mixture of claim 1, wherein said first complexing agent and said second complexing agent react to form a stable aminocarboxylate salt.

9. A paint mixture containing a corrosion inhibiting chemical composition compnsing:
   water;
   an amine complexing agent;
   a carboxylic acid complexing agent; and
   a pH adjusting agent;
   wherein said amine complexing agent is selected from the group consisting of 3-methoxypropylamine, 4-ethylmorpholine, dimethylaminopropylamine and aminopropylmorpholine; and wherein the paint mixture inhibits the corrosion of metal when applied to a metal substrate.

10. The paint mixture of claim 9, wherein said carboxylic acid complexing agent is benzoic acid.

11. The paint mixture of claim 9, wherein said pH adjusting agent is ammonium hydroxide.

12. The paint mixture of claim 9, wherein said chemical composition comprises approximately 50-80% by total formula weight water, approximately 2-20% by total formula weight amine complexing agent, approximately 5-20% by total formula weight carboxylic acid complexing agent, and approximately 5-7% by total formula weight pH adjusting agent.

13. A process of producing a paint mixture containing a corrosion inhibitor comprising the steps of:
    mixing together water and an amine complexing agent to create a first substance, wherein the amine complexing agent is an alkylamine selected from the group consisting of 3-methoxypropylamine 4-ethylmorpholine, dimethylaminopropylamine and aminopropylmorpholine;
    mixing together said first substance with a carboxylic acid complexing agent to create a second substance;
    mixing together said second substance with a pH adjusting agent to create said corrosion inhibitor; and
    incorporating the corrosion inhibitor into the paint mixture;
    wherein the paint mixture inhibits the corrosion of metal when applied to a metal substrate.

14. The process of claim 13, wherein said carboxylic acid complexing agent is benzoic acid.

15. The process of claim 13, wherein said pH adjusting agent is ammonium hydroxide.

16. The process of claim 13, wherein said chemical composition comprises approximately 50-80% by total formula weight water, approximately 2-20% by total formula weight amine complexing agent, approximately 5-20% by total formula weight carboxylic acid complexing agent, and approximately 5-7% by total formula weight pH adjusting agent.

17. A process of making a paint mixture containing a non-toxic corrosion inhibitor comprising the steps of providing in the paint mixture a non-toxic corrosion inhibitor comprising approximately 50-80% by total formula weight of water and adding approximately 2-20% by total formula weight of an amine complexing agent, approximately 5-20% by total formula weight of a carboxylic acid complexing agent, and approximately 5-7% by total formula weight of a pH adjusting agent, wherein said amine complexing agent is selected from the group consisting of 3-methoxypropylamine, 4-ethylmorpholine, dimethylaminopropylamine and aminopropylmorpholine; wherein the paint mixture inhibits the corrosion of metal when applied to a metal substrate.

18. The process of claim 17, further comprising the step of mixing said approximately 50-80% by total formula weight of water, 2-20% by total formula weight of said amine complexing agent, 5-20% by total formula weight of said carboxylic acid complexing agent, and 5-7% by total formula weight of said pH adjusting agent to create an aqueous mixture for incorporation into the paint mixture.

19. The process of claim 17, wherein said carboxylic acid complexing agent is benzoic acid.

20. The process of claim 18, further comprising the steps of:
    transferring said aqueous mixture to a holding tank; and
    allowing said mixture to cool to room temperature prior to incorporation into the paint mixture.

21. A paint mixture, containing a chemical composition that inhibits corrosion in metal substrates, said chemical composition comprising:
    a first complexing agent comprising an amine group; and
    a second complexing agent comprising a carboxylic acid;
    wherein the first complexing agent is an alkylamine selected from the group consisting of 3-methoxypropylamine, 4-ethylmorpholine, dimethylaminopropylamine and aminopropylmorpholine;
    wherein the paint mixture, when applied to a metal substrate, inhibits flash rusting of the metal.

22. The paint mixture of claim 1, wherein said paint mixture further includes a high gloss resin and wherein the chemical composition does not diminish the gloss.

23. The paint mixture of claim 1, wherein said paint mixture further includes a semi gloss resin and wherein the chemical composition does not diminish the gloss.

24. A process of producing a paint mixture containing a corrosion inhibitor comprising the steps of:
    mixing together water and an amine complexing agent comprising an alkylamine to create a first substance, wherein the alkylamine is selected from the group consisting of 3-methoxypropylamine, 4-ethylmorpholine, dimethylaminopropylamine and aminopropylmornholine;
    mixing together said first substance with a carboxylic acid complexing agent to create said corrosion inhibitor; and
    incorporating the corrosion inhibitor into the paint mixture;
    wherein the paint mixture inhibits the corrosion of metal when applied to a metal substrate.

25. A process of making a paint mixture containing a non-toxic corrosion inhibitor comprising the steps of providing in the paint mixture a non-toxic corrosion inhibitor comprising approximately 50-80% by total formula weight of water and adding approximately 2-20% by total formula weight of an amine complexing agent comprising an alkylamine selected from the group consisting of 3-methoxypropylamine, 4-ethylmorpholine, dimethylaminopropylamine and aminopropylmorpholine and approximately 5-20% by total formula weight of a carboxylic acid complexing agent; wherein the paint mixture inhibits the corrosion of metal when applied to a metal substrate.

26. The paint mixture of claim 1, wherein the alkylamine is aminopropylmorpholine.

* * * * *